(12) United States Patent
Suto et al.

(10) Patent No.: US 12,715,150 B2
(45) Date of Patent: Aug. 25, 2026

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 143 days.

(21) Appl. No.: 18/397,502

(22) Filed: Dec. 27, 2023

(65) Prior Publication Data

US 2024/0207953 A1 Jun. 27, 2024

(30) Foreign Application Priority Data

Dec. 27, 2022 (JP) ................................ 2022-210196
Dec. 27, 2022 (JP) ................................ 2022-210296
(Continued)

(51) Int. Cl.
*B26B 15/00* (2006.01)
*B23D 29/00* (2006.01)
(Continued)

(52) U.S. Cl.
CPC ............ *B26B 15/00* (2013.01); *B23D 29/002* (2013.01); *B23D 33/02* (2013.01); *B26B 29/04* (2013.01); *B26B 29/06* (2013.01)

(58) Field of Classification Search
CPC .... B23D 29/002; B23D 29/023; B23D 33/02; B26B 17/00; B26B 17/02; B26B 15/00;
(Continued)

(56) References Cited

U.S. PATENT DOCUMENTS 974,118 A * 11/1910 Burke .................. B23D 29/023 30/131
3,004,339 A * 10/1961 Townshend, Jr. ....... B26B 17/02 30/131
(Continued)

FOREIGN PATENT DOCUMENTS

CN 110148906 A * 8/2019 ............... H02G 1/00
CN 114260946 A 4/2022
(Continued)

OTHER PUBLICATIONS

English language translation of CN 110148906 A to Jing.*
Aug. 19, 2024—(EP) Search Report—App 23220296.0.

*Primary Examiner* — Evan H MacFarlane
(74) *Attorney, Agent, or Firm* — Banner & Witcoff, Ltd.

(57) ABSTRACT

An electric cutting device includes: a pair of cutting blades cutting an object by rotating about a rotation central axis; an electric motor for operating the cutting blades; and a guide plate having a recess in a manner of receding along a predetermined direction for housing the object in advance when cutting the object. An edge of the recess includes a pair of linear portions. When a position of the guide plate at a most front end along the predetermined direction is set as a first position, and a position in an operation range of each cutting blade at most front end along the predetermined direction is set as a second position, a distance between the first position and the second position along the predetermined direction is one-fourth or less of the predetermined interval.

10 Claims, 6 Drawing Sheets

(30) Foreign Application Priority Data

Dec. 27, 2022 (JP) ................................ 2022-210302
Dec. 27, 2022 (JP) ................................ 2022-210308
Dec. 27, 2022 (JP) ................................ 2022-210362
Dec. 27, 2022 (JP) ................................ 2022-210372
Dec. 27, 2022 (JP) ................................ 2022-210594
Dec. 27, 2022 (JP) ................................ 2022-210638

(51) Int. Cl.
*B23D 33/02* (2006.01)
*B26B 29/04* (2006.01)
*B26B 29/06* (2006.01)

(58) Field of Classification Search
CPC ........ B26B 29/04; B26B 29/06; H02H 1/005; B25F 5/021; A01G 3/02; A01G 3/033; A01G 3/037; A01G 2003/023; B26D 3/169
USPC .................................................... 30/175, 179
See application file for complete search history.

(56) References Cited

U.S. PATENT DOCUMENTS 3,012,321 A * 12/1961 Townshend, Jr. .... B23D 29/023 30/131
10,799,962 B2 10/2020 Barezzani et al.
2004/0158993 A1* 8/2004 Hasegawa ............... B26B 29/04 30/151
2005/0076513 A1* 4/2005 Brailovskiy ......... B23D 29/023 30/90.1
2006/0070245 A1* 4/2006 Erbrick ................... B26B 17/00 30/191
2009/0241351 A1 10/2009 Maniwa et al.
2011/0289998 A1 12/2011 Zhang
2013/0055575 A1 3/2013 Delmas
2014/0007434 A1 1/2014 Westley
2014/0020528 A1* 1/2014 Wason .................. B23D 17/00 83/13
2015/0089816 A1* 4/2015 Chiasson .............. B23D 17/00 30/233
2020/0316697 A1 10/2020 Ohta et al.
2021/0339410 A1 11/2021 Hayashi et al.
2022/0312680 A1 10/2022 Nii
2023/0137643 A1 5/2023 Gautier et al.

FOREIGN PATENT DOCUMENTS

EP 1452280 A1 9/2004
EP 2158803 A1 * 3/2010 ............. B26B 13/22
EP 3466578 A1 4/2019
GB 104627 A * 3/1917 ............. B26B 17/02
JP S46-12360 B 3/1971
JP S49-9833 Y1 3/1974
JP S56-12954 U 2/1981
JP S63-317181 A 12/1988
JP H03-86417 A 4/1991
JP H04-105816 A 4/1992
JP H06-165618 A 6/1994
JP 2004-122311 A 4/2004
JP 2005-001038 A 1/2005
JP 2005-224122 A 8/2005
JP 2008-022757 A 2/2008
JP 2017-209782 A 11/2017
JP 2018-058146 A 4/2018
JP 2019-141951 A 6/2019
JP 2019-166627 A 10/2019
JP 2019-217566 A 12/2019
JP 2019-217567 A 12/2019
JP 2020-093295 A 6/2020
JP 2021-171580 A 11/2021
JP 2022-157786 A 10/2022
WO 2021-175817 A1 9/2021

* cited by examiner

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, and Japanese Patent Application No. 2022-210638 filed on Dec. 27, 2022, the entire contents of which are incorporated herein by reference.

TECHNICAL FIELD

The present disclosure relates to an electric cutting device.

BACKGROUND ART

As an electric cutting device, a cutting device as described in JP2021-171580A is known, for example. In an electric cutting device, cutting blades are operated by a driving force of an electric motor instead of a gripping force of a user, and clamp an object to be cut and cut the object with the pair of cutting blades. The cutting device described in JP2021-171580A is provided with a pair of guide plates so as to sandwich the cutting blades from the outside. The guide plate is formed with a recess for receiving the object to be cut in advance and guiding the object to be cut to a predetermined position during cutting. When cutting the object to be cut, the cutting blades are closed with the object to be cut placed at the predetermined position.

By providing such guide plates, it becomes easy to set a positional relationship between the object to be cut and the cutting blades appropriately before cutting. When the cutting device is in a standby state, the cutting blades can be covered and protected by the guide plates.

SUMMARY

However, there may also be cases where if a floor or a wall is present near an object to be cut, for example, the object to be cut cannot be inserted into a recess of a guide plate to a sufficiently deep position, and the object to be cut cannot be cut.

Illustrative aspects of the present disclosure provide a cutting device that can cut an object to be cut near a wall or the like while protecting a cutting blade with a guide plate.

An electric cutting device includes: a pair of cutting blades configured to clamp and cut an object by rotating about a rotation central axis; an electric motor configured to generate a driving force necessary for operating the cutting blades; and a guide plate having a recess in a manner of receding along a predetermined direction, the recess being for housing the object in advance when the object is cut by the pair of cutting blades. An edge of the recess includes a pair of linear portions that are parallel to each other and face each other with a predetermined interval. When a position of the guide plate at a most front end along the predetermined direction is set as a first position, and a position in an operation range of each cutting blade at a most front end along the predetermined direction is set as a second position, a distance between the first position and the second position along the predetermined direction is one-fourth or less of the predetermined interval.

In the cutting device configured as described above, the distance between the first position, which is the front end of the guide plate, and the second position, which is the front end of the operation range of the cutting blade is kept small so as to be about one-fourth or less of the width of the recess (the above predetermined interval).

In many cases, the object has a diameter substantially equal to the width of the recess. Therefore, in the cutting device configured as described above, even if the object is in contact with a floor or a wall, it is possible to insert the object to a position that sufficiently overlaps a movable range of the cutting blade, and cut the object at that position.

According to the present disclosure, a cutting device that can cut an object to be cut near a wall or the like while protecting a cutting blade with a guide plate is provided.

DESCRIPTION OF EMBODIMENTS

Figure 1:
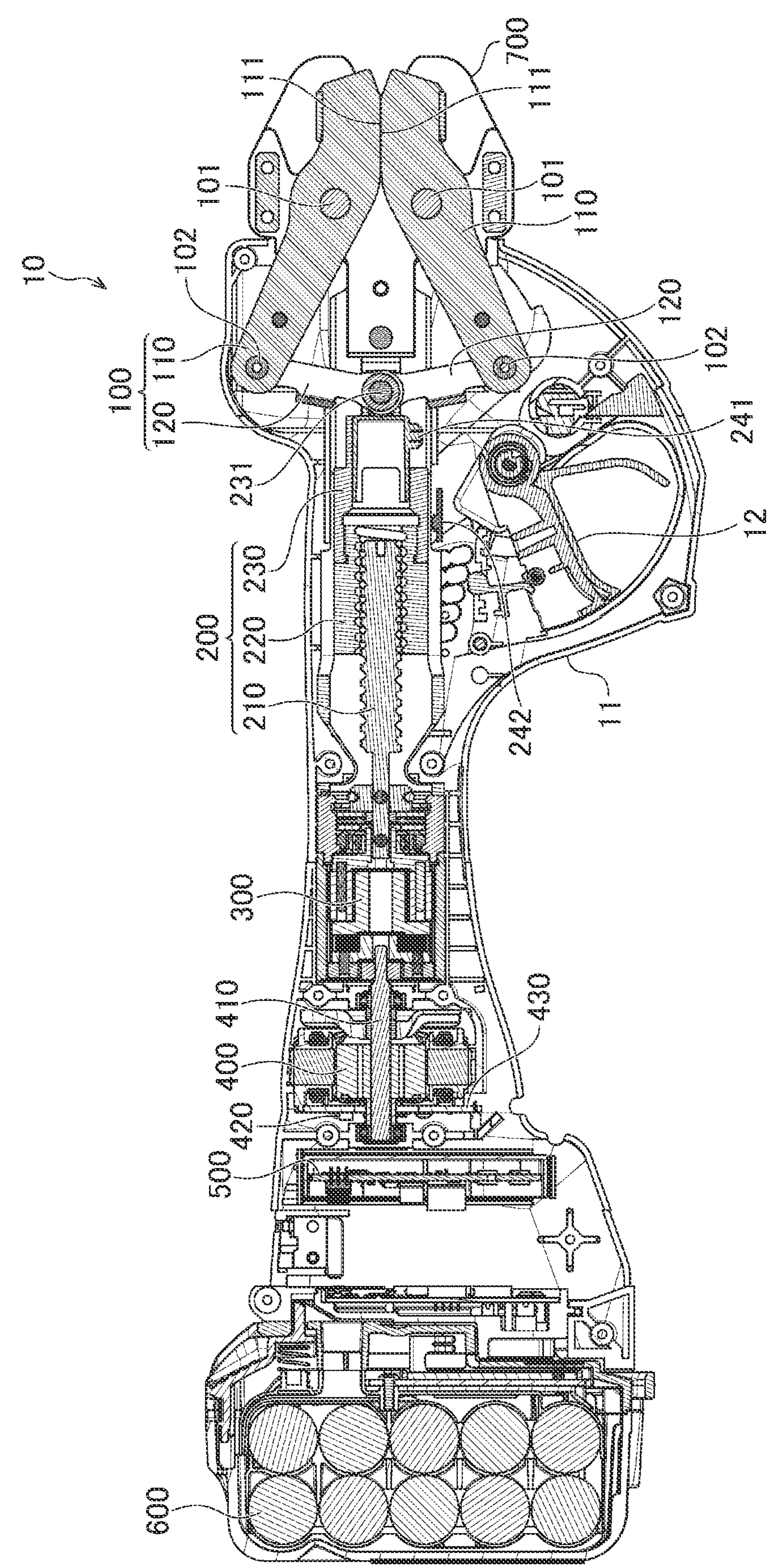
FIG. 1 is a diagram showing a configuration of a cutting device according to a first illustrative embodiment.

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device. The cutting device 10 is configured as a device for cutting a reinforcing bar at a construction site or the like. A configuration of the cutting device 10 will be described mainly with reference to FIG. 1. The cutting device 10 includes a housing 11, a trigger switch 12, a cutting mechanism 100, a ball screw 200, a speed reducer 300, an electric motor 400, a control board 500, and a storage battery 600.

The housing 11 is a container that defines an outer shape of the cutting device 10. The housing 11 is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and is turned off. When the trigger switch 12 is switched between an ON state and the OFF state, a corresponding signal is transmitted to the control board 500 described later. If the user performs an operation of switching the trigger switch 12 into the ON state, cutting of the reinforcing bar is started.

The cutting mechanism 100 is a portion configured to cut the reinforcing bar which is an object to be cut. The cutting mechanism 100 includes a pair of blade members 110 and a pair of link members 120.

The cutting blades 111 that clamp and cut the object to be cut are formed on the respective blade members 110. The blade member 110 is held pivotably about a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state where the respective cutting blades 111 are spaced apart from each other and a closed state where the respective cutting blades 111 come into contact with (or close to) each other. In the example of FIG. 1, the pair of cutting blades 111 are in the closed state.

Each link member 120 is a rod-shaped member, and one end of the link member 120 is connected to the blade member 110 via a shaft 102, and the other end of the link member 120 is connected to a connection member 230 described later via a shaft 231. The link member 120 and the blade member 110 are connected to each other in a manner of pivoting about the shaft 102. Similarly, the link member 120 and the connection member 230 are connected to each other in a manner of pivoting about the shaft 231. As will be described later, the connection member 230 moves in a left-right direction in FIG. 1 by a driving force of the electric motor 400.

If the connection member 230 moves in a left direction from the state shown in FIG. 1, the blade member 110 on an upper side of FIG. 1 pivots counterclockwise, and the blade member 110 on a lower side of FIG. 1 pivots clockwise. Accordingly, the pair of cutting blades 111 change from the closed state to the opened state. On the other hand, when the pair of cutting blades 111 are in the opened state, if the connection member 230 moves in the right direction in FIG. 1, the blade member 110 on the upper side of FIG. 1 pivots clockwise, and the blade member 110 on the lower side of FIG. 1 pivots counterclockwise. Accordingly, the pair of cutting blades 111 return to the closed state. Accordingly, the pair of blade members 110, the pair of link members 120, and the connection member 230 as a whole constitute a so-called "toggle link mechanism".

Figure 2:
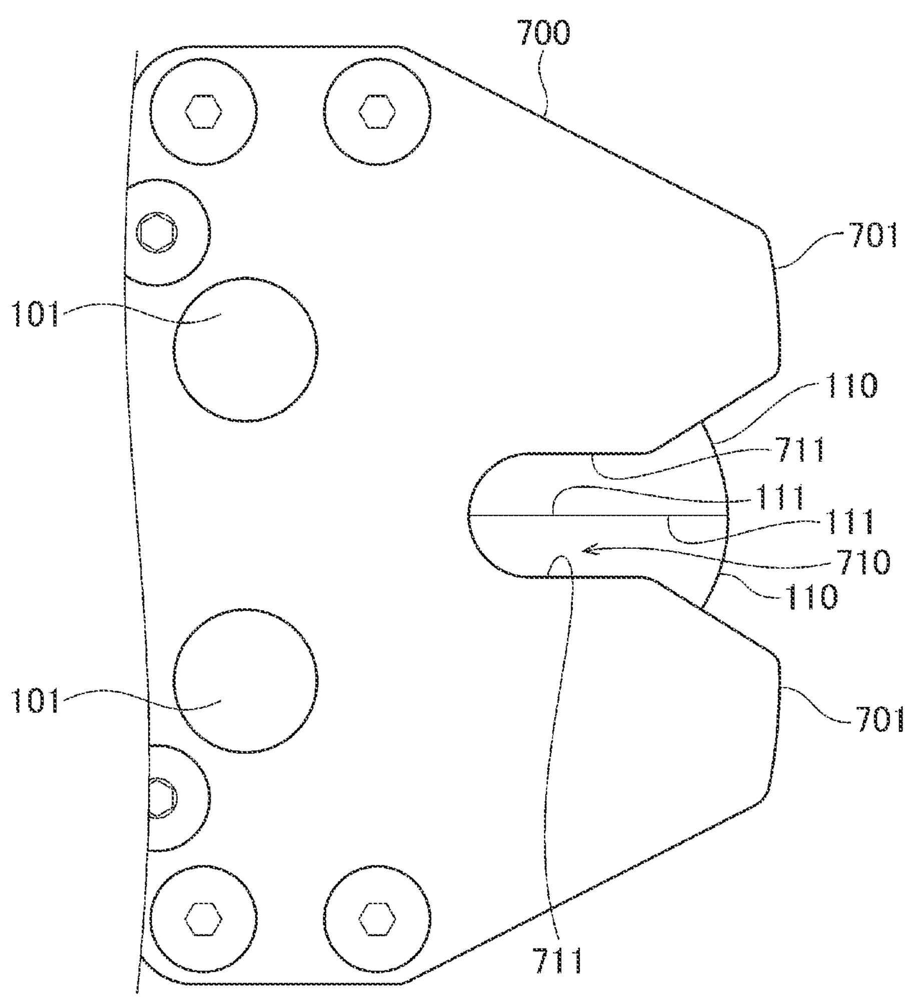
FIG. 2 is a diagram showing a configuration of guide plates included in the cutting device according to the first illustrative embodiment.

A pair of guide plates 700 are provided near the blade members 110. The guide plates 700 are plate-shaped members made of metal. The guide plates 700 are disposed to sandwich the blade members 110 from both the front side and the back side in FIG. 1 when viewed on paper. Shapes of the pair of guide plates 700 are substantially the same. As shown in FIG. 2, each guide plate 700 has a recess 710 formed therein. The recess 710 is for housing the reinforcing bar in advance when the cutting blades 111 cut the reinforcing bar.

Figure 3:
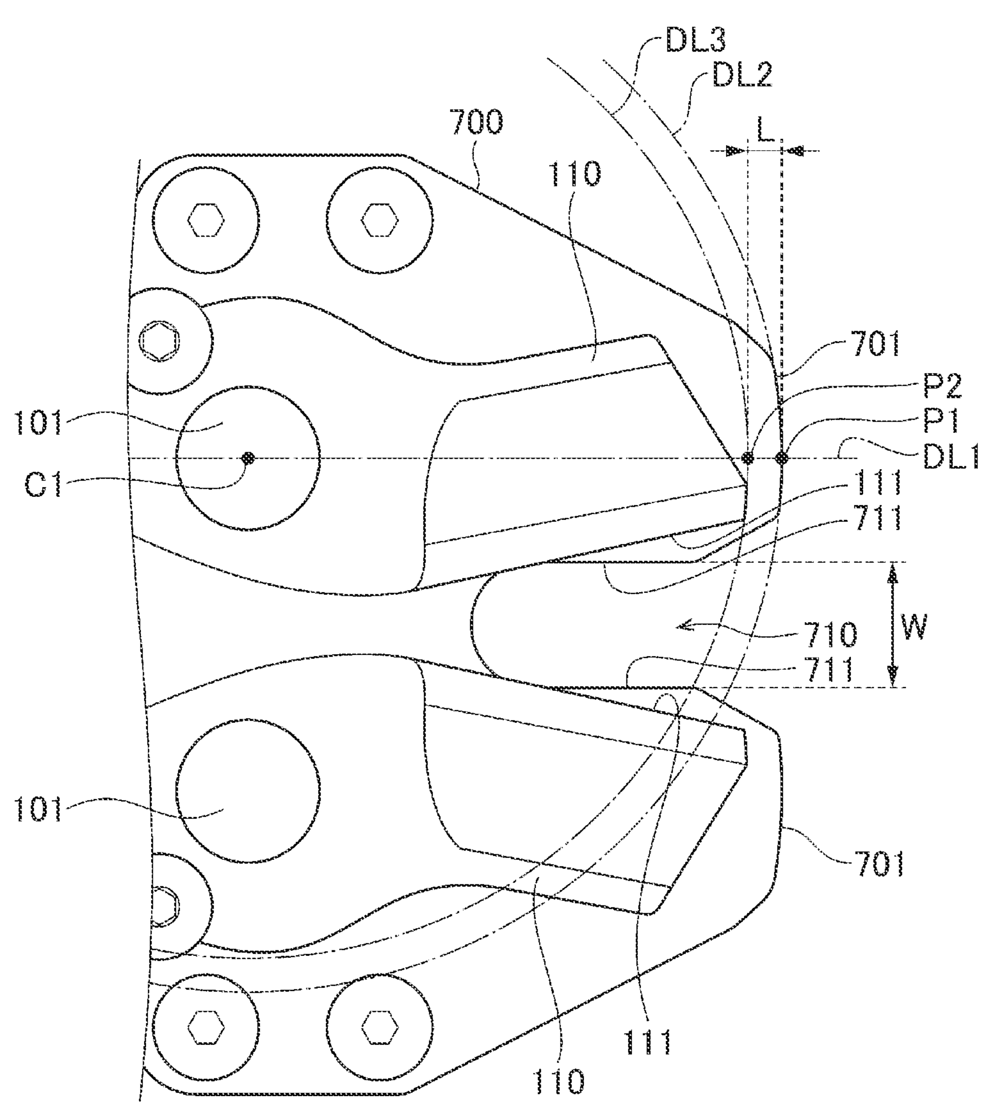
FIG. 3 is a diagram showing a configuration of the guide plates included in the cutting device according to the first illustrative embodiment.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from the side as shown in FIG. 1 and FIG. 2, each recess 710 is formed at a position that includes the cutting blade 111 in the closed state. In a standby state where the cutting blades 111 are fully opened, as shown in FIG. 3, the cutting blades 111 are retracted to the outside of the recesses 710, and the entire blade members 110 are hidden by the guide plates 700.

The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabilizing a posture of the cutting device 10 before and after cutting to be stable by sandwiching the reinforcing bar in the recesses 710. A specific configuration of the guide plate 700 will be described later.

Returning to FIG. 1, the description is continued. The ball screw 200 is a device for converting a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is a member attached to the nut 220 and is a member that moves along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is a device that is configured to reduce a rotation speed of an output shaft 410 of the electric motor 400 and then transmit the rotation to the screw shaft 210 of the ball screw 200.

The electric motor 400 is a rotating electrical machine for generating a driving force necessary for operating the cutting blades 111, and is, for example, a brushless DC motor.

The electric motor 400 has the output shaft 410. The output shaft 410 is a substantially cylindrical member, and a central axis thereof coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is configured to emit a pulse signal every time the output shaft 410 rotates by a predetermined angle. The rotation sensor 420 is provided on a board 430 included in the electric motor 400. The pulse signal from the rotation sensor 420 is transmitted to the control board 500. By counting the number of pulse signals, the control board 500 is able to know a rotation angle of the output shaft 410 after a specific timing. The control board 500 is also able to know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410.

The control board 500 is a circuit board provided to control an overall operation of the cutting device 10 including the electric motor 400. The control board 500 includes an inverter circuit for adjusting current supplied to the electric motor 400, a microcomputer for controlling a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is built is detachable from the housing 11 as a battery pack, and is connected to and charged by an external charger. Instead of such an aspect, a configuration may be adopted in which the storage battery 600 can be charged while the storage battery 600 is attached to the housing 11.

If the user performs the operation of switching the trigger switch 12 into the ON state, the control board 500 detects the operation and causes the cutting blades 111 to operate in a closing direction to cut the reinforcing bar. In order to perform such control, the control board 500 controls an operation of the electric motor 400 while acquiring a current position of the connection member 230.

In the present illustrative embodiment, a count value of the pulse signal input from the rotation sensor 420 is calculated and acquired by the control board 500 as the "current position" of the connection member 230, based on a time when the magnet 241 and the Hall sensor 242 face each other.

In order to enable acquisition of the current position of the connection member 230, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the current position of the connection member 230 can be accurately acquired from then on.

The control board 500 is configured to control an opening and closing operation of the cutting blades 111 by adjusting magnitude of current supplied to the electric motor 400, for example, by PWM control. The control board 500 also controls a braking operation of the cutting blades 111 by performing a so-called "short braking" that short-circuits some of a plurality of coils included in the electric motor 400 periodically or continuously.

The above control is merely an example. The control executed by the control board 500 may cause the cutting blades 111 to operate according to the state of the trigger switch 12, and various known kinds of control may be employed.

A specific configuration of the guide plate 700 will be described. As shown in FIG. 2, the recess 710 for housing the reinforcing bar, which is the object to be cut, is formed in a manner of receding from a front end of the guide plate 700 along a predetermined direction. The "predetermined direction" described here is a direction from the rear end side to the front end side, and is a direction parallel to the central axis of the screw shaft 210.

An edge of the recess 710 shown in FIG. 2 and FIG. 3 includes a pair of linear portions 711 that are parallel to each other and face each other with a predetermined interval. The direction where the linear portions 711 extend is the same as the predetermined direction described above.

As shown in FIG. 3, a distance (the above predetermined interval) between the pair of linear portions 711 indicated by W. This W will also be referred to as an "interval W" below. The interval W may be said to be a width of the recess 710. A dimension of the interval W is set to be approximately equal to a typical diameter of the reinforcing bar which is the object to be cut by the cutting device 10.

A reference numeral "C1" shown in FIG. 3 represents a central axis of the shaft 101 extending along a depth direction when viewed on paper. The blade member 110 and the cutting blade 111 rotate about this C1. That is, the central axis indicated by C1 corresponds to a rotation central axis of the blade member 110 and the cutting blade 111. The central axis indicated by C1 will also be referred to as a "rotation central axis C1" below.

A circle indicated by a dotted line DL2 in FIG. 3 is a circle centered on the rotation central axis C1 and passing the front end of the guide plate 700. When viewed along the rotation central axis C1 as shown in FIG. 3, an outer shape of the front end portion of the guide plate 700 has an arc shape with a part thereof coinciding with the dotted line DL2. In other words, the center of curvature of this portion is on the rotation central axis C1. The front end portion formed in an arc shape in this manner will also be referred to as an "arc portion 701" below.

A dotted line DL1 shown in FIG. 3 is a line that passes through the rotation central axis C1 and is parallel to the central axis of the screw shaft 210. P1, which is an intersection of the dotted line DL1 and the dotted line DL2, is located on the arc portion 701, and is located at a position on the most front end side of the guide plate 700 along the above "predetermined direction". This position will also be referred to as a "first position P1" below.

A circle indicated by a dotted line DL3 in FIG. 3 is a circle centered on the rotation central axis C1 and passing a front end of the cutting blade 111. The dotted line DL3 can also be said to indicate a trajectory along which the front end of the cutting blade 111 moves. In FIG. 3, the dotted lines DL1, DL2, and DL3, and the like are shown only for an upper side portion of the recess 710, and a configuration of the portion shown in FIG. 3 of the cutting device 10 is symmetrical above and below the recess 710.

P2, which is an intersection of the dotted line DL1 and the dotted line DL3, represents a position at the most front end side along the above "predetermined direction" within an operation range of the cutting blade 111. This position will also be referred to as a "second position P2" below. In the present illustrative embodiment, the guide plate 700 is configured such that a distance L between the first position P1 and the second position P2 along the above predetermined direction is zero or more and about one-fourth or less of the interval W.

Figure 4:
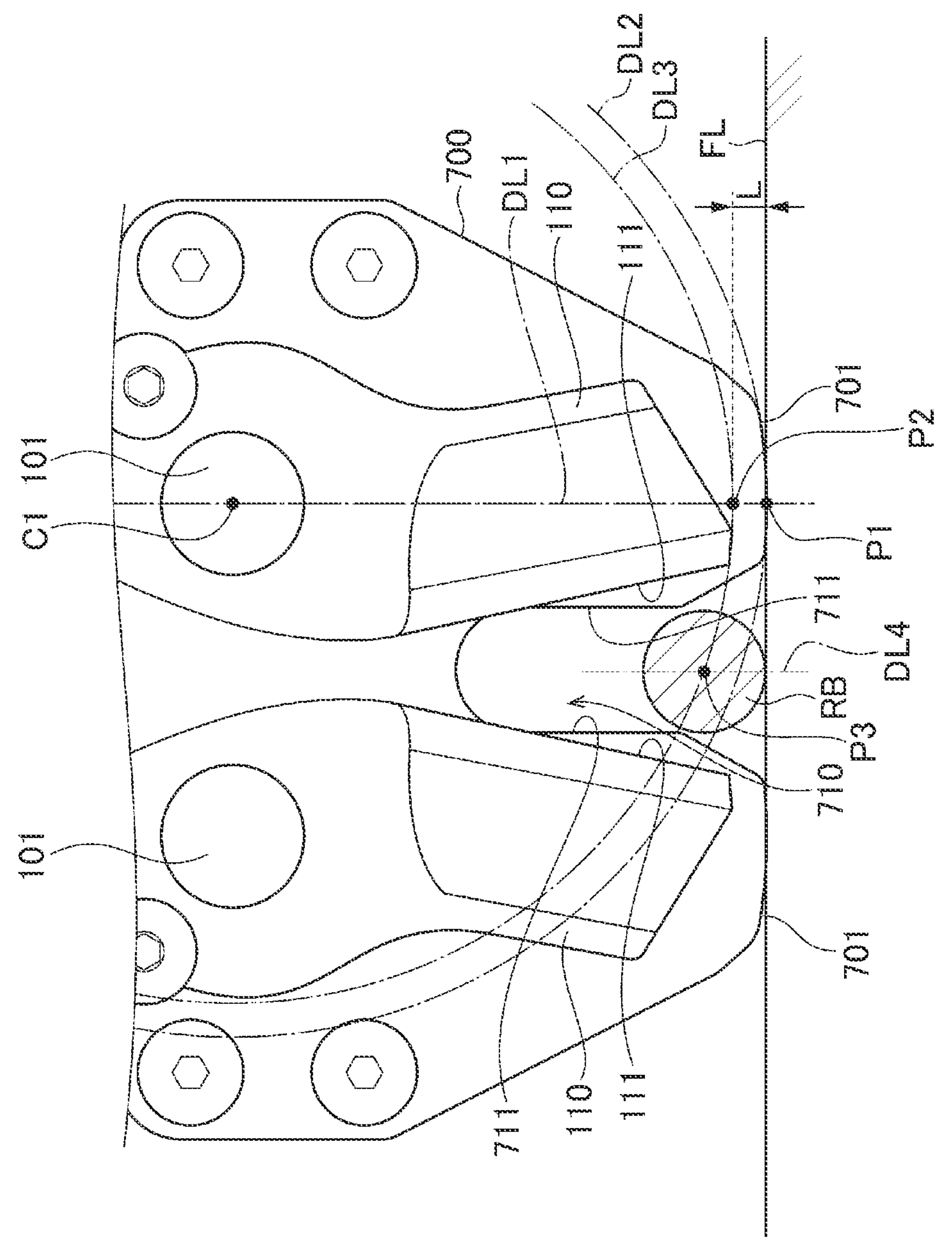
FIG. 4 is a diagram for illustrating a case where an object to be cut placed on a floor is cut.

Advantages of such a configuration will be described. At a construction site or the like, there is a case where it is desired to cut a reinforcing bar RB placed on a floor FL as shown in FIG. 4 using a cutting device without lifting the reinforcing bar RB on the floor FL. However, there is a case where if the cutting device is provided with a guide plate, since the guide plate abuts the floor FL before the cutting blade, the reinforcing bar RB cannot be inserted to a sufficiently deep position in a recess of the guide plate, and the reinforcing bar RB cannot be cut.

Therefore, in the present illustrative embodiment, a protrusion amount of the guide plate 700 is kept small such that $L \leq 1/4 \times W$ as described above.

When cutting the reinforcing bar RB placed on the floor FL using the cutting device 10 having such a configuration, as shown in FIG. 4, the user moves the cutting blades 111 in the closing direction with the arc portions 701 of the guide plates 700 abutting the floor FL. Each cutting blade 111 operates on the trajectory such that the front end passes the dotted line DL3 in FIG. 4.

A dotted line DL4 in FIG. 4 represents a position of the cutting blades 111 in the closed state. A point P3 is an intersection of the dotted line DL4 and the dotted line DL3.

When the cutting blade 111 operates in the closing direction, the front end of the cutting blade 111 is closest to the floor FL when passing the second position P2. Then, the front end of the cutting blade 111 moves slightly away from the floor FL, and finally reaches the point P3. That is, the point P3 is closer to a deepest part of the recess 710 than the second position P2 in the predetermined direction.

As shown in FIGS. 3 and 4, a distance between the first position P1 and the point P3 along the predetermined direction is more than the distance L between the first position P1 and the second position P2 and less than the interval W, and preferably, corresponds to approximately half of the interval W. In many cases, a diameter of the reinforcing bar RB is approximately equal to the interval W, which is the width of the recess 710. In this case, the front end of the cutting blade 111 that operates as described above passes approximately near the center of the reinforcing bar RB as shown in FIG. 4. When each of the cutting blades 111 moves on the above trajectory and passes the reinforcing bar RB while cutting a part of the reinforcing bar RB, an area of the reinforcing bar RB that the cutting blade 111 does not pass also breaks due to plastic deformation. Therefore, the reinforcing bar RB can be cut at this position. The same applies when the reinforcing bar RB is located near a wall or the like that is perpendicular to the floor.

In this way, the cutting device 10 according to the present illustrative embodiment can cut the reinforcing bar RB near the floor FL and the like while protecting the cutting blade 111 with the guide plate 700.

The guide plate 700 of the present illustrative embodiment is formed with the arc portion 701 at the front end thereof. As described with reference to FIG. 3, the center of curvature of the arc portion 701 is on the rotation central axis C1. Therefore, for example, when the floor FL has unevenness, even if a portion of the arc portion 701 other than the first position P1 abuts the floor FL, a minimum necessary distance can be secured between the front end of the cutting blade 111 and the floor FL.

A second illustrative embodiment will be described. In the following, points different from the first illustrative embodiment will be mainly described, and descriptions of points common to those of the first illustrative embodiment will be omitted as appropriate. The present illustrative embodiment differs from the first illustrative embodiment in the shape of the guide plate 700.

Figure 5:
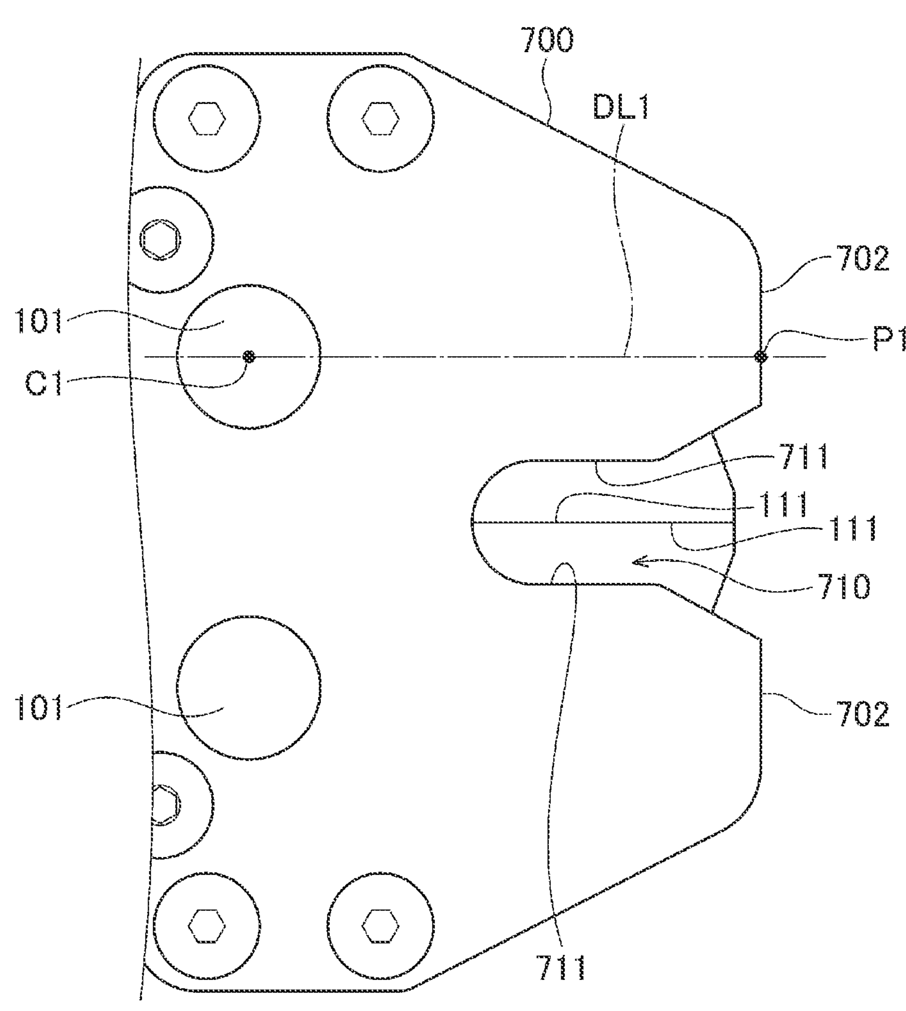
FIG. 5 is a diagram showing a configuration of guide plates included in a cutting device according to a second illustrative embodiment.

As shown in FIG. 5, in the present illustrative embodiment, the front end portion of the guide plate 700 does not have an arc shape, and a flat surface 702 is formed at the front end of the guide plate 700. The flat surface 702 is a surface perpendicular to the central axis of the screw shaft 210.

A dotted line DL1 in FIG. 5 is the same as the dotted line DL1 shown in FIG. 3. An intersection of the dotted line DL1 and the flat surface 702 is the first position P1 in the present illustrative embodiment. The flat surface 702 is a surface that includes the first position P1, which is a position at the most front end of the guide plate 700.

Although not shown, in the present illustrative embodiment as well, the same "second position P2" as in the first illustrative embodiment can be defined. In the present illustrative embodiment, similarly to the first illustrative embodiment, a position of the flat surface 702 in the guide plate 700 is adjusted such that the distance L between the first position P1 and the second position P2 along the predetermined direction is one-fourth or less of the interval W. In such an aspect, the same effects as those described in the first illustrative embodiment can also be achieved.

Similarly to FIG. 4, when cutting the reinforcing bar RB placed on the floor FL, the user operates the cutting blade 111 in the closing direction with the flat surface 702 of the guide plate 700 abutting the floor FL. Since the entire flat surface 702 abuts the floor FL, the posture of the cutting device 10 during cutting can be more stable.

A third illustrative embodiment is described. In the following, points different from the first illustrative embodiment will be mainly described, and descriptions of points common to those of the first illustrative embodiment will be omitted as appropriate. The present illustrative embodiment differs from the first illustrative embodiment in the configuration of the guide plate 700.

Figure 6:
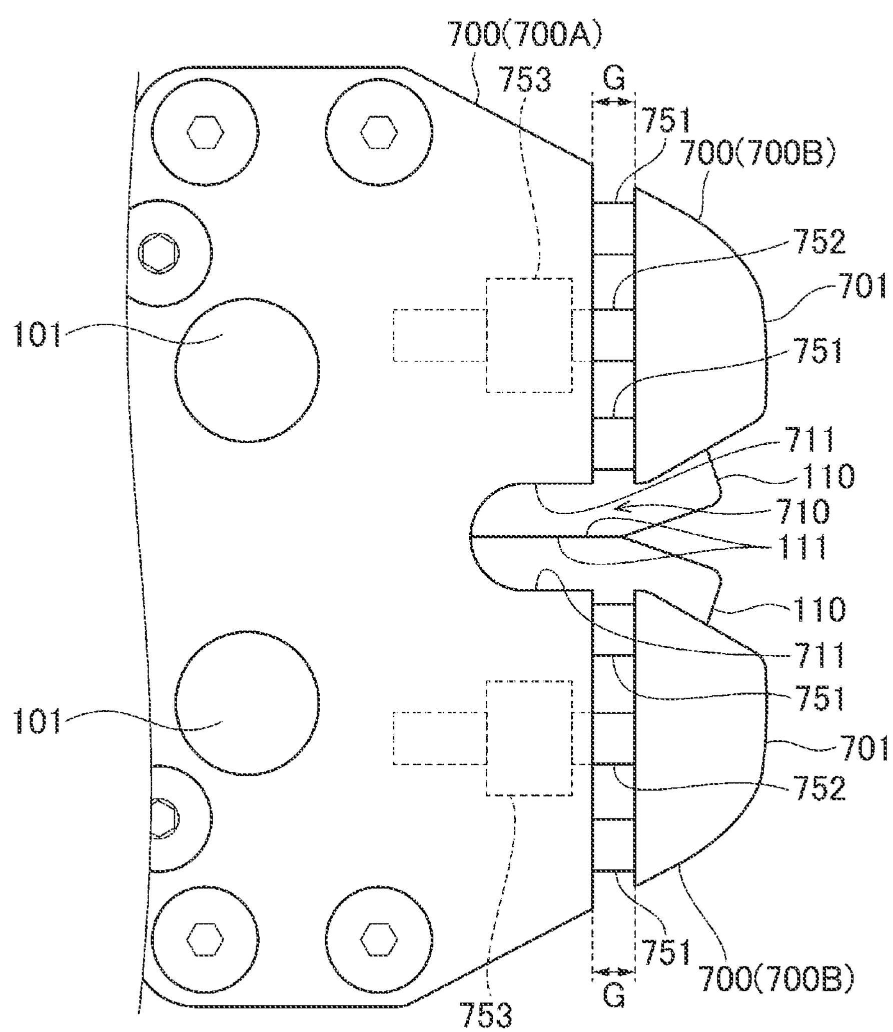
FIG. 6 is a diagram showing a configuration of guide plates included in a cutting device according to a third illustrative embodiment.

As shown in FIG. 6, each guide plate 700 in the present illustrative embodiment is divided into a base portion 700A, which is a portion overlapping the shaft 101, and a front end portion 700B, which is a portion on the front end side. The base portion 700A and the front end portion 700B are connected by slide shafts 751 and a screw shaft 752.

The slide shaft 751 is a rod-shaped member that extends linearly in the direction parallel to the central axis of the screw shaft 210. An end on a front end side of the slide shaft 751 is fixed to the front end portion 700B. A portion on a rear end side of the slide shaft 751 is supported by the base portion 700A in a manner of being slidable in the direction parallel to the central axis of the screw shaft 210. The two slide shafts 751 are provided for one front end portion 700B. However, the number of slide shafts 751 may be different from the two.

The screw shaft 752 is a rod-shaped member that extends linearly in the direction parallel to the central axis of the screw shaft 210. The screw shaft 752 has a male screw (not shown) formed on an outer peripheral surface thereof. An end on a front end side of the screw shaft 752 is fixed to the front end portion 700B. The screw shaft 752 is inserted through an adjustment nut 753 provided on the base portion 700A.

A through hole (not shown) is formed in the adjustment nut 753, and the screw shaft 752 is inserted through the through hole. A female screw is formed on an inner surface of the through hole of the adjustment nut 753, and is screwed together with a male screw on the outer peripheral surface of the screw shaft 752.

The adjustment nut 753 is fixed to the base portion 700A while being rotatable about a central axis of the adjustment nut 753. When the adjustment nut 753 is rotated by the user, the screw shaft 752 moves along a longitudinal direction thereof, and the front end portion 700B also moves together with the screw shaft 210. That is, the entire guide plate 700 including the base portion 700A and the front end portion 700B expands and contracts along the longitudinal direction of the screw shaft 752. In order to facilitate such an operation, a part or all of the adjustment nut 753 may be exposed to the outside through an opening provided in the base portion 700A.

In this way, by the user operation, the guide plate 700 is caused to expand and contract by rotating the adjustment nut 753 so that the protrusion amount of the guide plate 700 from the cutting blade 111 (corresponding to the distance L in FIG. 3) can be adjusted. The slide shafts 751, the screw shaft 752, and the adjustment nut 753 correspond to an "expansion and contraction mechanism" for causing the guide plate 700 to expand and contract. A configuration in which the above protrusion amount can be adjusted to be negative may also be adopted. That is, the cutting blade 111 may be configured to be adjustable such that the cutting blade 111 protrudes further toward the front end side than the guide plate 700.

A specific configuration of the expansion and contraction mechanism may be different from the present illustrative embodiment. For example, the adjustment nut 753 may be replaced with a worm gear. Each of the aforementioned adjustment nut and worm gear may be referred to as an adjuster.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:

a pair of cutting blades configured to clamp and cut an object by each rotating about a respective rotation central axis;

an electric motor configured to generate a driving force necessary for operating the cutting blades;

a guide plate formed with a recess for housing the object in advance when the object is cut by the pair of cutting blades; and an expansion and contraction mechanism comprising a slide shaft, a screw shaft, and an adjuster, the expansion and contraction mechanism being configured to cause the guide plate to expand and contract along a predetermined direction.

2. An electric cutting device, comprising:

a pair of cutting blades configured to clamp and cut an object by each rotating about a respective rotation central axis;

an electric motor configured to generate a driving force necessary for operating the cutting blades;

a guide plate having a recess, the recess receding along a predetermined direction, the recess being for housing the object in advance when the object is cut by the pair of cutting blades; and an expansion and contraction mechanism comprising a slide shaft, a screw shaft, and an adjuster, the expansion and contraction mechanism being configured to cause the guide plate to expand and contract along the predetermined direction, wherein an edge of the recess includes a pair of linear portions that are parallel to each other and face each other with a predetermined interval, and wherein when a position of the guide plate at a most front end of the guide plate along the predetermined direction is set as a first position, and a position in an operation range of each of the cutting blades at a most front end of the cutting blades along the predetermined direction is set as a second position, a distance between the first position and the second position along the predetermined direction is one-fourth or less of the predetermined interval.

3. The cutting device according to claim 2, wherein a portion of the guide plate that includes the first position is formed with an arc portion, an outer shape of the arc portion being an arc shape when viewed along one of the rotation central axes.

4. The cutting device according to claim 3, wherein a center of curvature of the arc portion is on the one of the rotation central axes.

5. The cutting device according to claim 2, wherein a portion of the guide plate that includes the first position is formed with a flat surface.

6. The cutting device according to claim 5, wherein the flat surface is perpendicular to the predetermined direction.

7. The cutting device according to claim 2, wherein the second position is closer to the rotation central axes than the first position in the predetermined direction.

8. The cutting device according to claim 2, wherein when a position of the most front end of the cutting blades in a closed state is set as a third position, the third position is closer to a deepest part of the recess than the second position in the predetermined direction.

9. The cutting device according to claim 8, wherein a distance between the first position and the third position along the predetermined direction is more than the distance between the first position and the second position and less than the predetermined interval.

10. The cutting device according to claim 8, wherein the distance between the first position and the third position along the predetermined direction corresponds to substantially half of the predetermined interval.

* * * * *